United States Patent [19]
Vetter et al.

[11] Patent Number: 5,377,815
[45] Date of Patent: Jan. 3, 1995

[54] CONVEYOR APPARATUS FOR BATCH TREATMENT OF OBJECTS

[75] Inventors: Helmut Vetter, Ravensburg; Gerhard Ruppenthal, Vogt; Klaus Steinbach, Baienfurt, all of Germany

[73] Assignee: Arzneimittel GmbH Apotheker Vetter & Co., Ravensburg, Germany

[21] Appl. No.: 212,179

[22] Filed: Mar. 11, 1994

[30] Foreign Application Priority Data

Mar. 12, 1993 [DE] Germany .................. 4307906

[51] Int. Cl.⁶ .................................... B65G 47/34
[52] U.S. Cl. .................. 198/476.1; 198/478.1
[58] Field of Search ............... 198/469.1, 470.1, 473.1, 198/474.1, 475.1, 476.1, 478.1, 429, 430, 803.1, 803.4, 803.14

[56] References Cited

U.S. PATENT DOCUMENTS

| | | | |
|---|---|---|---|
| 1,775,381 | 9/1930 | Angus | 198/478.1 X |
| 2,986,211 | 5/1961 | Hartmann et al. | 198/476.1 X |
| 4,199,049 | 4/1980 | Vamvakas | 198/478.1 X |
| 5,074,397 | 12/1991 | Mukai et al. | 198/478.1 X |
| 5,191,964 | 3/1993 | Spisak et al. | 198/430 X |

*Primary Examiner*—James R. Bidwell
*Attorney, Agent, or Firm*—Herbert Dubno; Andrew Wilford

[57] ABSTRACT

A conveyor system has a carousel rotatable about an axis in steps and having an outer periphery along which loading, unloading, and treatment stations are spaced and a drive for rotating the carousel about the axis in steps. A plurality of fixed segments spaced along the periphery each have a straight outer edge and a plurality of movable segments spaced along the periphery are interleaved with the fixed segments and each have a straight outer edge and a pair of ends. Respective pivots secured between one of the ends of each of the movable segments and the carousel allow movement of each of the movable segments between an inner position with its outer edge nonparallel to the outer edges of adjacent fixed segments and an outer position with its outer edge parallel to the outer edge of a one of the adjacent fixed segments. A controller at the loading and unloading stations pivots the movable segments into the outer positions when same are stopped in the loading and unloading stations and otherwise normally maintains the movable segments in the inner positions. A row of a plurality of holders is provided for the objects on each of the outer edges so that when a fixed segment block and a movable segment block are in the loading or unloading station all of the respective holders are aligned and can be loaded or unloaded simultaneously.

9 Claims, 3 Drawing Sheets

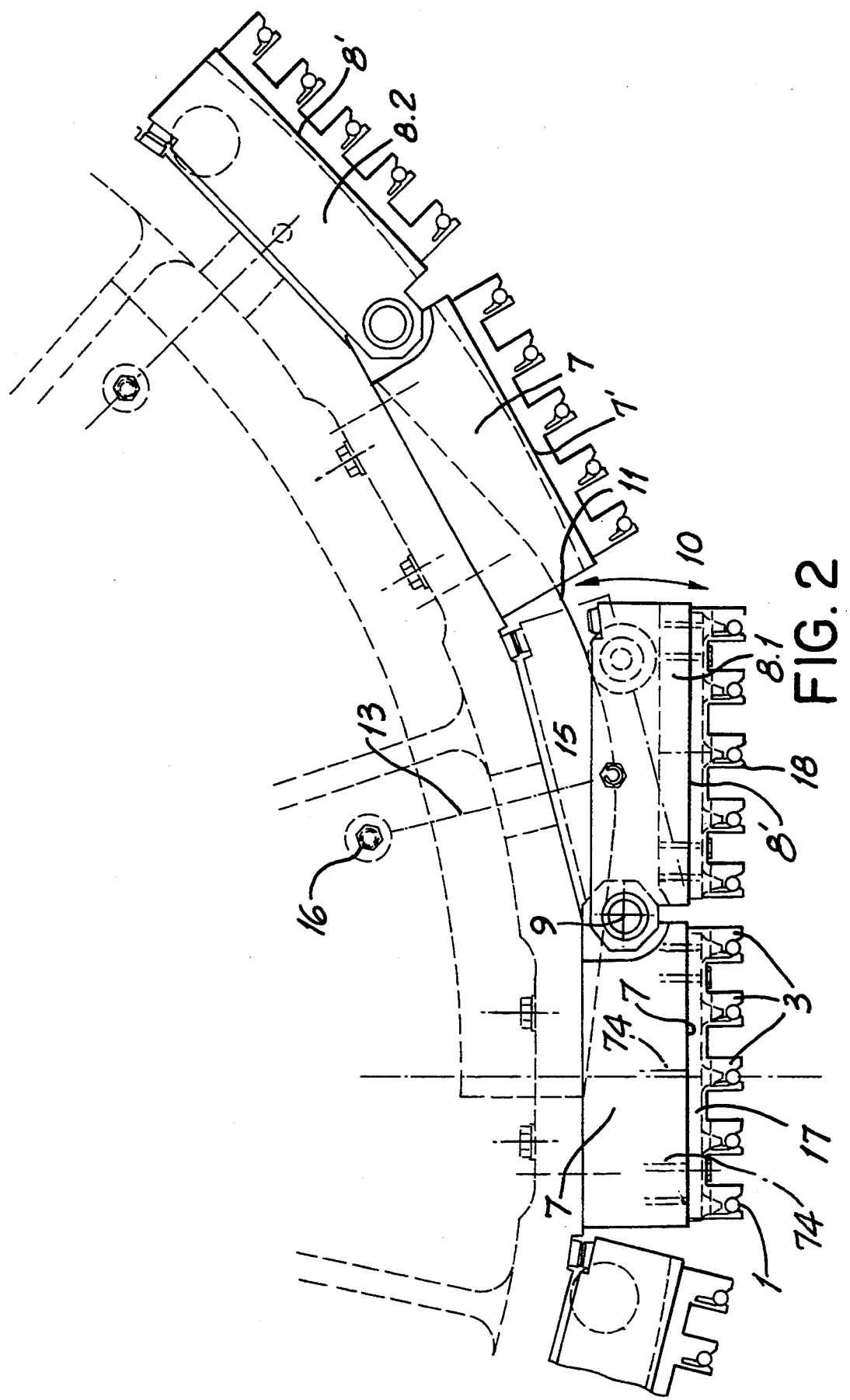

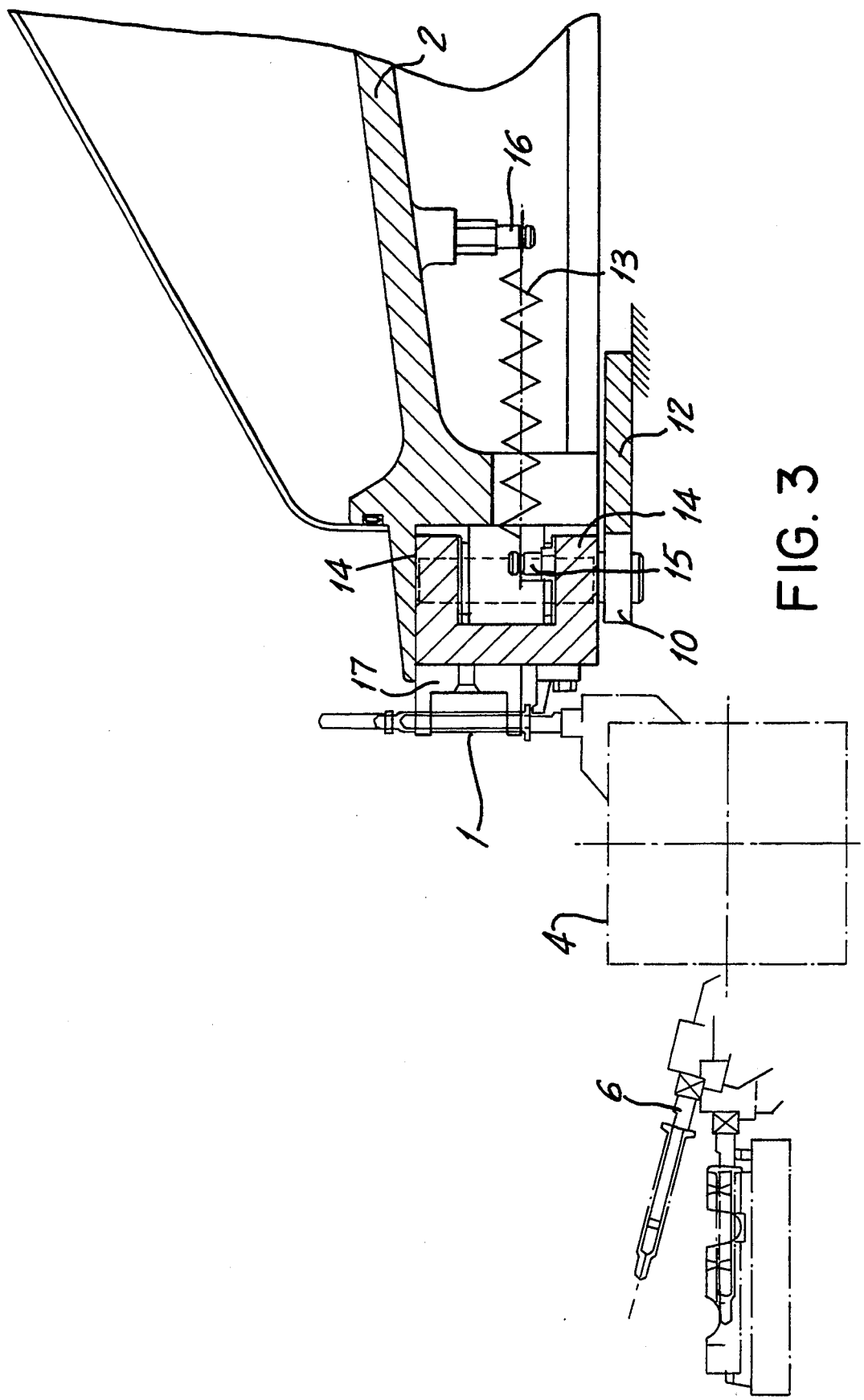

CONVEYOR APPARATUS FOR BATCH TREATMENT OF OBJECTS

FIELD OF THE INVENTION

The present invention relates to the batch treatment of objects. More particularly this invention concerns an apparatus for working on a plurality of like objects, in this case empty syringe bodies, and on an apparatus for conveying the objects in batches through a series of treatment stations.

BACKGROUND OF THE INVENTION

In the production of disposable hypodermic syringes it is necessary to subject the syringe bodies to a series of treatments before filling them. They must be sterilized with hot water or air, dried, coated with silicone and so on. This is typically done by mounting the tubular syringe bodies in holders on the periphery of a rotor or carousel that is rotated in steps to move the objects through successive treatment stations.

Each of the treatment steps is normally relatively short compared to the time necessary to fit the objects to the seats or holders of the carousel and remove them therefrom. Therefore it is standard to form the periphery of the carousel as a sequence of straight tangentially extending sections each having a straight row of the object holders. Thus the loading and unloading devices can, with each step of the carousel, fit a batch comprised of a plurality of the objects to the carousel or remove the batch therefrom. In a standard arrangement there are twenty-four such sections each having five such holders so that the carousel is moved steps of 15° and each time it is stopped five objects are stripped from one of the sections while immediately downstream from this unloading station at a loading station a loading device fits five objects to empty holders.

While such a system represents a substantial increase in throughput, the loading and unloading still represent a bottleneck in production, in that these steps are still the main factor limiting throughput.

OBJECTS OF THE INVENTION

It is therefore an object of the present invention to provide an improved batch treatment system.

Another object is the provision of such an improved batch treatment system which overcomes the above-given disadvantages, that is which can be unloaded and loaded so efficiently that these steps are not the factor limiting the efficiency of the device.

SUMMARY OF THE INVENTION

The instant invention is used in combination with a loading device capable of loading a plurality of objects as a batch at a loading station, an unloading device capable of unloading a plurality of objects as a batch at an unloading station offset angularly relative to an axis to the loading station, and a plurality of treatment stations spaced angularly relative to the axis between the loading and unloading station. The conveyor system according to the invention has a carousel rotatable about the axis in steps and having an outer periphery along which the stations are spaced and a drive for rotating the carousel about the axis in steps. A plurality of fixed segments spaced along the periphery each have a straight outer edge and a plurality of movable segments spaced along the periphery are interleaved with the fixed segments and each have a straight outer edge and a pair of ends. Respective pivots secured between one of the ends of each of the movable segments and the carousel allow movement of each of the movable segments between an inner position with its outer edge nonparallel to the outer edges of angularly immediately adjacent fixed segments and an outer position with its outer edge parallel to the outer edge of a one of the adjacent fixed segments. A controller at the loading and unloading stations pivots the movable segments into the outer positions when same are stopped in the loading and unloading stations and otherwise normally maintains the movable segments in the inner positions. A row of a plurality of holders is provided for the objects on each of the outer edges so that when a fixed segment block and a movable segment block are in the loading or unloading station all of the respective holders are aligned and can be loaded or unloaded simultaneously.

Thus it is possible at the unloading and loading stations to transfer a number of objects from and to the carousel that is a whole number multiple of the amount that a prior-art system could handle, three times as many when each fixed segment is flanked by two respective movable segments and twice as many when each fixed segment is paired with a single movable segment. Since at least twice as many objects are being transferred with each step, the available transfer time is effectively halved, even with loading and unloading devices which work sequentially. On the other hand as the objects traverse the various treatment stations, they are oriented against the carousel periphery, as in a prior-art system.

According to a further feature of the invention when one of the fixed blocks is in the outer position its holders are aligned with and equally spaced from the holders of the respective one fixed block. Furthermore the controller includes a fixed cam having an edge adjacent the carousel edge and a cam follower on the other end of each of the movable blocks and riding on the cam. The cam edge is deflected outwardly at the loading and unloading stations. Respective springs engaged between the movable blocks and the carousel bias the followers of movable blocks radially inward against the cam edge. Each movable block is of C-section and has a pair of vertically spaced flanges, one of which is provided between the respective ends with a pin on which the respective spring is engaged.

In accordance with a further feature of the invention a strip fixed on each of the outer edges carries the respective plurality of holders and is releasably secured to the respective outer edge. Thus when the workpiece object is changed, these strips need merely be replaced with appropriately dimensioned ones. Each outer edge has the same number of holders and there is the same number of fixed blocks as movable blocks and the fixed blocks alternate with the movable blocks.

BRIEF DESCRIPTION OF THE DRAWING

The above and other objects, features, and advantages will become more readily apparent from the following description, reference being made to the accompanying drawing in which:

FIG. 2 is a large-scale view of a detail of FIG. 1; and

FIG. 3 is a large-scale vertical section taken along line III—III of FIG. 1.

SPECIFIC DESCRIPTION

Figure 1:
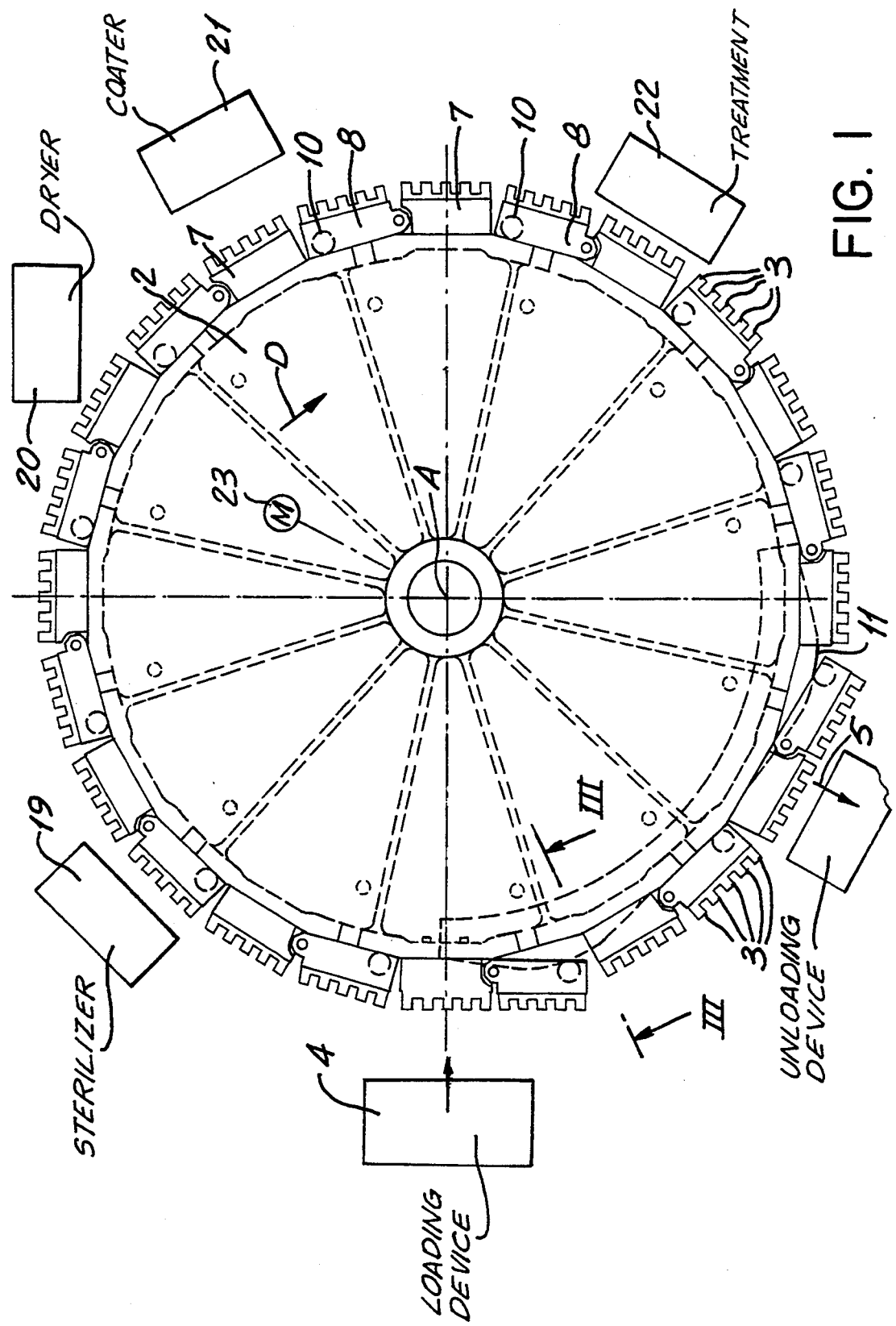
FIG. 1 is a largely schematic top view of the system of this invention.

As seen in FIG. 1 a carousel 2 is formed basically as a large wheel rotatable about a vertical axis A by a motor 23 in 30° steps. It is provided along its outer periphery with a loading device or station 4, a sterilizing station 19, a drying station 20, a coating station 21, a further treatment station 22, and an unloading station or device 5 immediately upstream of the loading station 4. As seen in FIG. 3, the loading device 4, like the unloading device 5, is provided with a row of ten in-line fingers 6 that can each pick up a respective object, here a syringe body 1, and fit it to a respective holder 3 carried on the carousel 2.

According to the invention the outer periphery of the carousel 2 is provided with twelve identical fixed segment blocks 7 each having a flat outer edge or surface 7' lying in a plane parallel to the axis A and centrally tangent to an imaginary cylinder centered on this axis A. Interleaved with the segment blocks 7 are substantially identical segment blocks 8 each having, relative to a rotation direction D of the carousel 2, an upstream end secured at a vertical pivot 9 parallel to the axis A to the carousel 2 and a planar outer surface or edge 8'.

As further seen in FIGS. 2 and 3 the downstream end of each segment block 8 is provided with a roller 10 rotatable about a vertical axis and riding on an outer periphery 11 of a large cam ring 12 fixed underneath the carousel 2. Each block 8 is of C-section with a pair of horizontal inwardly extending flanges 14 traversed by the pin 9, A pin 15 projecting upward from the center of each lower flange 14 is connected to the outer end of a tension spring 13 whose inner end is connected to an anchor pin 16 fixed on the carousel rotor 2 so as to pull the follower wheel 10 against the cam periphery 11.

This cam periphery 11 has two outwardly projecting lobes in the region of the loading device 4 and unloading device 5. Thus as each segment moves to these positions it is pivoted outward from the position shown at 8.2 in FIG. 2 in which it is tangential to the axis A and its outer surface is not parallel to the outer surface of either of the blocks 7 flanking it to an outer position 8.1 in which its outer surface extends perfectly parallel to the outer surface of the immediately upstream fixed segment block 7, As the blocks 7 and 8 pass through or adjacent the various treatment devices 19-22 they normally lie in their inner positions, The outer surface of each block 7 and 8 carries a strip 17 of five of the holders 3 formed between laterally deflectable fingers 18 and each set up to hold a respective one of the objects 1. Screws 24 secure the holder strips 17 in place so they can be easily switched with holder strips dimensioned for differently sized objects.

Thus each time the rotor 2 stops the unloading device 5 can remove ten objects 1 from the aligned holders 3 of two blocks 7 and 8 and the loading device 4 can similarly fit ten objects 1 to the aligned holders 3 of two downstream blocks 7 and 8.

We claim:

1. In combination with a loading device capable of loading a plurality of objects as a batch at a loading station, an unloading device capable of unloading a plurality of objects as a batch at an unloading station offset angularly relative to an axis to the loading station, and a plurality of treatment stations spaced angularly relative to the axis between the loading and unloading station, a conveyor system comprising:

a carousel rotatable about the axis in steps and having an outer periphery along which the stations are spaced;

drive means for rotating the carousel about the axis in steps;

a plurality of fixed segments spaced along the periphery and each having a straight outer edge;

a plurality of movable segments spaced along the periphery, interleaved with the fixed segments, each having a straight outer edge, and each having a pair of ends;

means including respective pivots secured between one of the ends of each of the movable segments and the carousel for movement of each of the movable segments between an inner position with its outer edge nonparallel to the outer edges of adjacent fixed segments and an outer position with its outer edge parallel to the outer edge of a one of the adjacent fixed segments;

control means at the loading and unloading stations for pivoting the movable segments into the outer positions when same are stopped in the loading and unloading stations and for otherwise normally maintaining the movable segments in the inner positions; and a row of a plurality of holders for the objects on each of the outer edges, whereby when a fixed segment block and a movable segment block are in the loading or unloading station all of the respective holders are aligned and can be loaded or unloaded simultaneously.

2. The conveyor system defined in claim 1 wherein when one of the fixed blocks is in the outer position its holders are aligned with and equally spaced from the holders of the respective one fixed block.

3. The conveyor system defined in claim 1 wherein the control means includes:

a fixed cam having an edge adjacent the carousel edge; and a cam follower on the other end of each of the movable blocks and riding on the cam, the cam edge being deflected outwardly at the loading and unloading stations.

4. The conveyor system defined in claim 3 wherein the control means further includes respective springs engaged between the movable blocks and the carousel and biasing the followers of movable blocks radially inward against the cam edge.

5. The conveyor system defined in claim 4 wherein each of the movable blocks is of C-section and has a pair of vertically spaced flanges.

6. The conveyor system defined in claim 5 wherein one of the flanges of each of the movable blocks is provided between the respective ends with a pin on which the respective spring is engaged.

7. The conveyor system defined in claim 1 further comprising a strip fixed on each of the outer edges and carrying the respective plurality of holders; and means releasably securing each of the strips to the respective outer edge.

8. The conveyor system defined in claim 1 wherein each outer edge has the same number of holders.

9. The conveyor system defined in claim 1 wherein there is the same number of fixed blocks as movable blocks and the fixed blocks alternate with the movable blocks.

* * * * *

UNITED STATES PATENT AND TRADEMARK OFFICE
CERTIFICATE OF CORRECTION

PATENT NO. : 5,377,815

DATED : January 3, 1995

INVENTOR(S) : Helmut Vetter et al

It is certified that error appears in the above-identified patent and that said Letters Patent is hereby corrected as shown below:

On the title page, item: [73] assignee should read:

-- Arzneimittel GmbH Apotheker Vetter & Co. Ravensburg,

Ravensburg, Germany --

Signed and Sealed this

Eighteenth Day of April, 1995

Attest:

BRUCE LEHMAN

*Commissioner of Patents and Trademarks*

*Attesting Officer*